(12) United States Patent
Khivantsev et al.

(10) Patent No.: US 11,071,966 B2
(45) Date of Patent: Jul. 27, 2021

(54) HIGH-CAPACITY, LOW-TEMPERATURE, PASSIVE NOX AND CD ADSORBERS AND METHODS FOR MAKING SAME

(71) Applicants: BATTELLE MEMORIAL INSTITUTE, Richland, WA (US); WASHINGTON STATE UNIVERSITY, Pullman, WA (US)

(72) Inventors: Konstantin Khivantsev, Richland, WA (US); Janos Szanyi, Richland, WA (US); Nicholas R. Jaegers, Richland, WA (US); Libor Kovarik, West Richland, WA (US); Feng Gao, Framingham, MA (US); Yong Wang, Richland, WA (US)

(73) Assignee: BATTELLE MEMORIAL INSTITUTE, Richland, WA (US)

(*) Notice: Subject to any disclaimer, the term of this patent is extended or adjusted under 35 U.S.C. 154(b) by 121 days.

(21) Appl. No.: 16/546,641

(22) Filed: Aug. 21, 2019

(65) Prior Publication Data
US 2020/0061595 A1 Feb. 27, 2020

Related U.S. Application Data

(60) Provisional application No. 62/720,535, filed on Aug. 21, 2018.

(51) Int. Cl.
*B01J 29/74* (2006.01)
*B01J 20/18* (2006.01)
*B01J 23/44* (2006.01)
*B01J 29/22* (2006.01)
*B01J 29/035* (2006.01)
*B01J 29/03* (2006.01)

(52) U.S. Cl.
CPC ............. *B01J 20/186* (2013.01); *B01J 23/44* (2013.01); *B01J 29/0325* (2013.01); *B01J 29/0354* (2013.01); *B01J 29/22* (2013.01); *B01J 29/743* (2013.01)

(58) Field of Classification Search
CPC ............................. B01J 20/186; B01J 29/743
See application file for complete search history.

(56) References Cited

U.S. PATENT DOCUMENTS 10,005,075 B2 * 6/2018 Rajaram .............. B01J 29/7415

OTHER PUBLICATIONS

Ryou et al., "Activation of Pd/SSZ-13 catalyst by hydrothermal aging treatment inpassive NO adsorption performance at low temperature for cold startapplication" Applied Catalysis B: Environmental 212 (2017) 140-149 (Year: 2017).*
Mihai et al, "The Effect of Si/Al Ratio for Pd/BEA and Pd/SSZ-13 Used as Passive NOx Adsorbers" Topics in Catalysis (2018) 61:2007-2020 (Year: 2018).*

* cited by examiner

*Primary Examiner* — David M Brunsman
(74) *Attorney, Agent, or Firm* — Derek H. Maughan

(57) ABSTRACT

Disclosed are passive $NO_x$ adsorbers and methods for synthesizing the same. Small-pore zeolitic materials with practical loadings of transition metals atomically dispersed in the micropores are described herein. Also demonstrated are simple and scalable synthesis routes to high loadings of atomically dispersed transition metals in the micropores of a small-pore zeolite.

17 Claims, 4 Drawing Sheets

HIGH-CAPACITY, LOW-TEMPERATURE, PASSIVE NOX AND CD ADSORBERS AND METHODS FOR MAKING SAME

CLAIM TO PRIORITY

This application claims priority from provisional patent application No. 62/720,535 filed Aug. 21, 2018 the contents of which are hereby incorporated by reference in their entirety.

ACKNOWLEDGEMENT OF GOVERNMENT SUPPORT

This invention was made with Government support under Contract DE-AC0576RL01830 awarded by the U.S. Department of Energy. The Government has certain rights in the invention.

FIELD

The present disclosure relates to emissions abatement and more particularly to passive adsorption of NOx and/or CO at low temperatures using zeolites having high transition metal loadings.

BACKGROUND

Most NOx emissions from internal combustion engines occur during cold-starts (e.g., at temperatures that are 150° C. and lower) when the SCR catalyst is still inactive. This is a major source of NOx pollution in the world and it affects public health and atmospheric chemistry. Transition-metal zeolites under certain conditions are very effective at storing NOx at low temperatures, however obtaining sufficient metal loadings has been a challenge due to metal aggregation. Accordingly, there is a need for zeolitic materials with practical loadings of dispersed transition metals and for methods of making the same. The present disclosure provides an advance in this regard.

SUMMARY

The present describes a passive adsorber for pre-selected gasses such as CO or NOx, and methods for making such. In most instances, the passive adsorber comprises a zeolite having a loading greater than 0.3 wt % of a dispersed transition metal. In some instances, the passive adsorber zeolite comprises SSZ-13. In other instances, the loading is greater than or equal to 0.5 wt %. In some instances, the loading is greater than or equal to 1 wt %. In some instances, the transition metal comprises Pt, in other instances the transition metal comprises Pd. In some instances, the dispersed transition metal is atomically dispersed within the pores of the zeolite.

Such an adsorber can be formed for example in a method wherein a NH4-form of a zeolite is exposed to a transition metal precursor that contains a counter ion whereby ions are exchanged between the zeolite and the transition metal precursor, to yield a NH4-counter ion product. The NH4-counter ion product is then decomposed into a gaseous product. In some instances, this decomposition may take place at a temperature less than 400 degrees, sometimes less than 250, and separations of decomposition gasses such as H2O, N2O or both may be removed through a membrane.

In some instances, the zeolite comprises SSZ-13. The transition metal precursor may comprise Pt or Pd. The counter ion of the transition metal precursor may comprise NO3. In some instances, the NH4-counter ion product may comprise NH4NO3. In some instances the method includes the exposing of an H-form of zeolite to a transition metal precursor comprising Pt or Pd and a counter ion in the presence of ammonium hydroxide; exchanging ions between the zeolite and the transition metal precursor, to yield a NH4-counter ion product; and then decomposing the NH4-counter ion product into a gaseous product; and removing the gaseous product via separation through a membrane. In some instances, the zeolite comprises SSZ-13 and the transition metal precursor may comprise Pt or Pd. The counter ion of the transition metal precursor may comprise NO3. The NH4-counter ion product may decompose at a temperature less than 400° C., and perhaps less than 250° C. The NH4-counter ion product may comprise NH4NO3. Depending upon the circumstances the exposing occurs in a mixture having a pH less than or equal to 12.5.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

Various advantages and novel features of the present disclosure are described herein and will become further readily apparent to those skilled in this art from the following detailed description. In the preceding and following descriptions, I have shown and described only the preferred embodiment of the disclosure, by way of illustration of the best mode contemplated for carrying out the disclosure. As will be realized, the disclosure is capable of modification in various respects without departing from the disclosure. Accordingly, the drawings and description of the preferred embodiment set forth hereafter are to be regarded as illustrative in nature, and not as restrictive.

BRIEF DESCRIPTION OF THE DRAWINGS

FIG. 4A shows the location of the complexes in the cavity of the chabazite framework, represented by Pd2+ (NO) complex; FIG. 4B shows the local structure of Pd2+ (CO)(NO)

Figure 6:
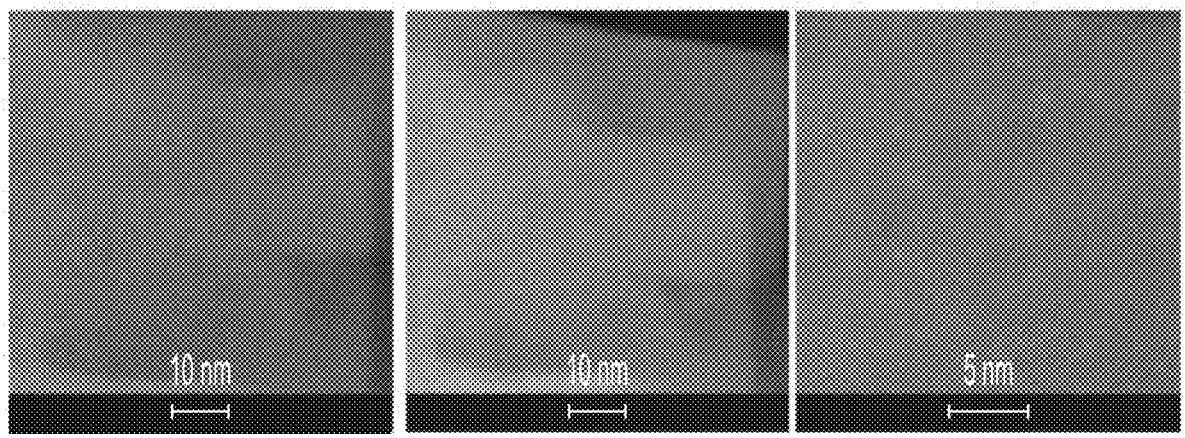

FIG. 6 shows examples of HAADF-STEM images of one set of embodiments.

Figure 7:
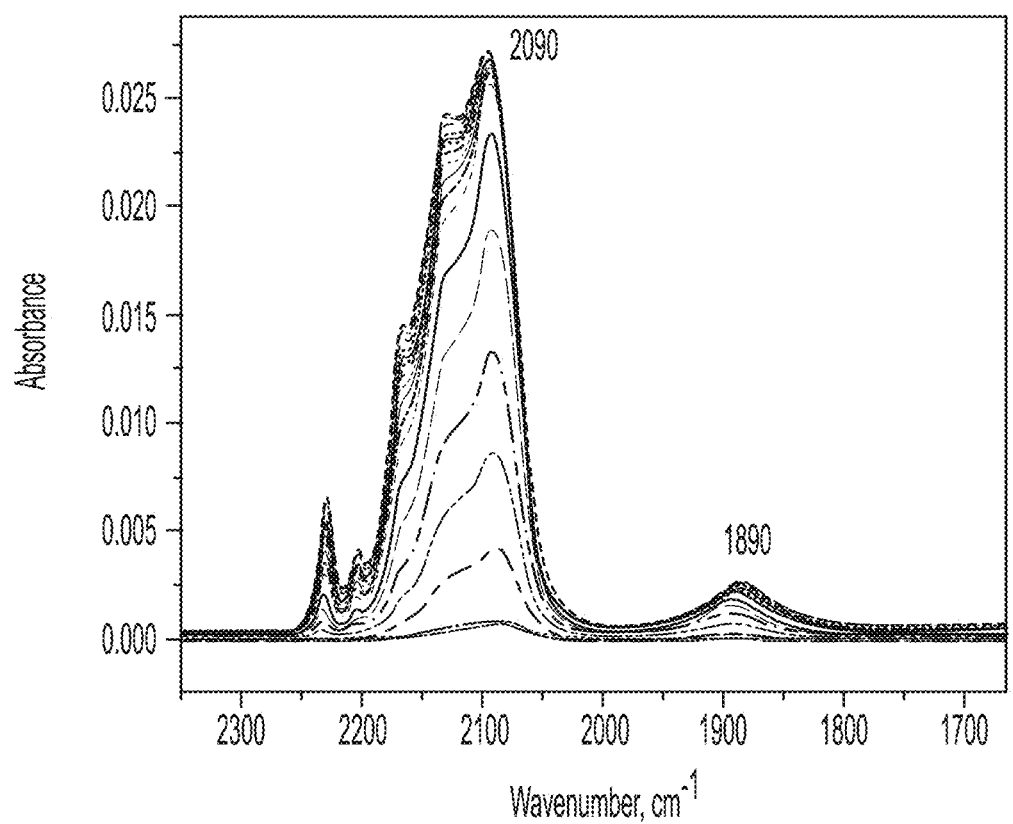

FIG. 7 shows CO adsorption (5 Torr, 20° C.) on 1 wt % Pt/H—SSZ-13 (Si/Al=6) that was calcined in oxygen at 400° C. 2090 and 1890 cm-1 bands belong to metallic Pt.

DESCRIPTION

Further illustrations of certain embodiments of the disclosed adsorber materials and methods of making the same are provided hereafter and are show in the attached FIGS. 1-7. These examples are exemplary only and are should not be seen as limiting in any way.

The present disclosure provides examples of CO and passive $NO_x$ adsorbers and methods for synthesizing the same. Synthesizing small-pore zeolitic materials with realistic loadings of transition metals atomically dispersed in the micropores has previously been seen as a formidable challenge. The present disclosure provides examples of a new simple and scalable route to high loadings (>1 wt %) of atomically dispersed transition metals in the micropores of a small-pore zeolite such as SSZ-13. Unlike previous attempts that require the addition of expensive transition metal precursor complexes into a synthesis gel which produces a low loading of atomically dispersed species, the examples provided herein do not require any complicated synthetic procedures. Furthermore, these methods and examples demonstrate that ionically dispersed Pd/SSZ-13 shows record-breaking performance as a new class of environmentally important passive $NO_x$ and CO adsorber (PNA) material under practically relevant conditions.

Pd-loaded zeolites are able to store NOx at low temperatures as NO+ and Pd(I/II)-NO nitrosyl complexes, both in the absence and in the presence of oxygen in the feed gas mixture. Engine exhaust contains a gas mixture of water ($H_2O$) and carbon monoxide (CO) in significant amounts. Water competes for Pd sites and blocks NO adsorption thus reducing the efficacy of the catalyst. However, in the presence of both CO and $H_2O$, Pd unexpectedly forms a mixed carbonyl nitrosyl complex (Pd(II)(NO)(CO)) that suppresses water poisoning of the catalyst and helps to preserve the PNA performance. The active site in such systems are Pd(II) ions present in extra framework positions of the zeolite. In order to optimize PNA performance, the concentration of ionically dispersed Pd in the zeolite micropore should be maximized. We discovered a general method to prepare high loadings (0.3 wt % and higher) of atomically dispersed transition metals such as platinum and palladium.

In one embodiment, we demonstrated a new simple and scalable route to such high Pd and Pt loadings (>1 wt %) atomically dispersed in the micropores of a small-pore zeolite, SSZ-13. Unlike all previous methods that require addition of expensive transition metal precursor complexes into the synthesis gel and produce low loading of atomically dispersed species, this method does not require any complicated synthetic procedures. Furthermore, the difference between the behavior of Pt and Pd during synthesis, and demonstrate that ionically dispersed Pd/SSZ-13 shows superior performance as a new class of environmentally important passive NOx adsorber (PNA) material under practically relevant conditions. It thus represents the 2nd known metal-small pore zeolite material that has immediate industrial application, and the only known metal-small zeolite material in which metal is close to 100% utilized. In addition to NOx, the material performs remarkably for CO removal during cold start as well due to the formation of a mixed carbonyl-nitrosyl complex Pd(II)(CO)(NO). We have recently shown that Pd-loaded zeolites were able to store NOx at low temperatures as NO+ and Pd(I/II)-NO nitrosyl complexes, both in the absence and in the presence of oxygen in the feed gas mixture. These nitrosyl complexes (Pd(II)(NO)(CO)) help to preserve the PNA performance by suppressing water poisoning.

Figure 1:
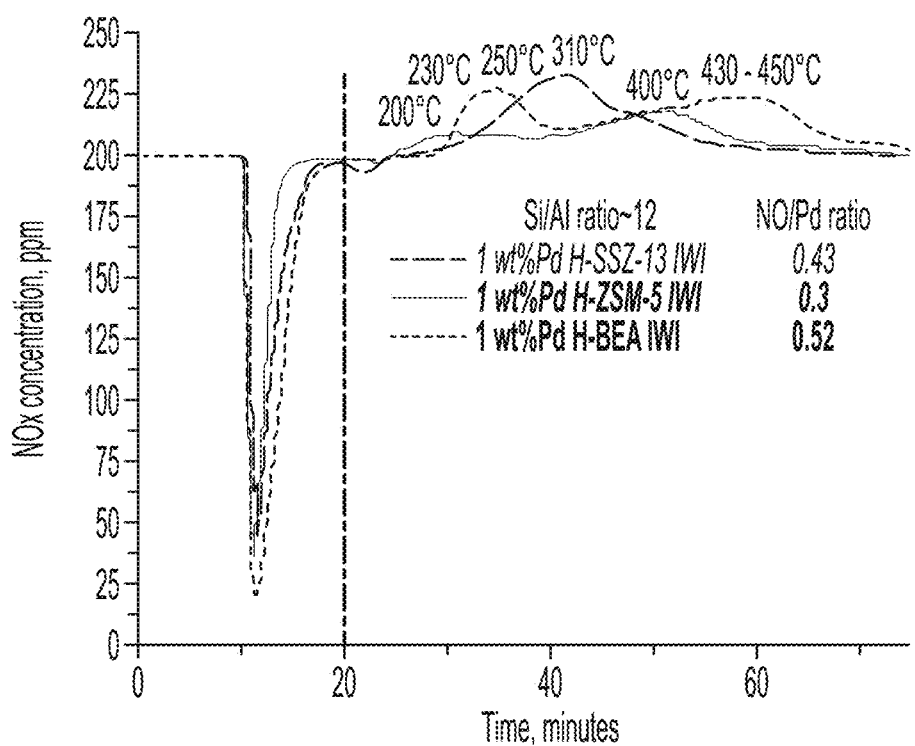
FIG. 1 shows the results of testing for NOx adsorption at 100° C. for 10 min (after 10 min by-pass) followed with TPD (10° C./min). The feed gas mixture contains 200 ppm of NOx, 14% O2, 3% H2O with 200 ppm CO.

The active site in such systems are Pd(II) ions present in extra framework positions of the zeolite. In order to optimize PNA performance, the concentration of ionically dispersed Pd in the zeolite micropore is maximized. In one study we used H-forms of zeolites (SSZ-13, ZSM-5 and Beta) with the same Si/Al ratio of 12 to load Pd by the incipient wetness impregnation (IWI) method. The PNA performance of the thus prepared Pd/zeolite materials was satisfactory and comparable to the state-of-the-art literature but the Pd was underutilized, the NO/Pd ration was much less than 1. The results of such testing are shown in FIG. 1.

In the highly acidic environment inside the zeolite micropores, there is a competition for basic zeolite sites between protons and Pd ions, and protons typically win this competition. As a consequence, only a limited amount of metal cations ends up in extra framework positions when aqueous M(II) precursor solutions are mixed with H— from zeolites. In some cases, multiple cycles of ion-exchange maybe required to shift the equilibrium toward the formation of metal zeolite with significant metal loadings. Such a loading can take place in one simple step if one of the products formed could be decomposed to gaseous compounds at low temperatures, thus shifting the equilibrium to the right in accordance with the Le-Chatellier principle similar to the way that NH3 for example is decomposed. Due to a thermodynamic equilibrium, one cannot fully decompose NH3 at normal high (>400° C.) operating temperatures. To push the equilibrium to the right, membranes are used that selectively remove the produced hydrogen gas. Since we do not want to decompose the Pd—O-Zeolite, NH4X salt is used to decompose to gaseous products.

One counter ion that can provide function is nitrate. NH4NO3 starts decomposing just above 180° C., producing only gaseous N2O and H2O that are removed at this temperature. With NH4-SSZ-13, either Pd(NO3)2 or [Pd(NH3)4](NO3)2 results thus demonstrating a viable option as a modified ion-exchange method. If one has to start with the H-form of zeolite, the Pd ammonia precursor should be dissolved in excess of ammonia solution with pH no higher than 11.5-12 (to avoid crystal disintegration) and reacted with the zeolite to form NH4-zeolite in-situ. We used this "modified ion-exchange" method to prepare materials with 1 wt % loading of Pd on NH4-SSZ-13 with Si/Al ratios 6, 12 and 30. We chose SSZ-13 because it has a high hydrothermal stability among all zeolites and shows ideal temperature for NOx release >300° C. After loading the metal precursor onto NH4-SSZ-13 the materials were calcined at 650° C. in air. The PNA performance of these three materials with different Si/Al ratios is displayed in FIG. 2.

Figure 2:
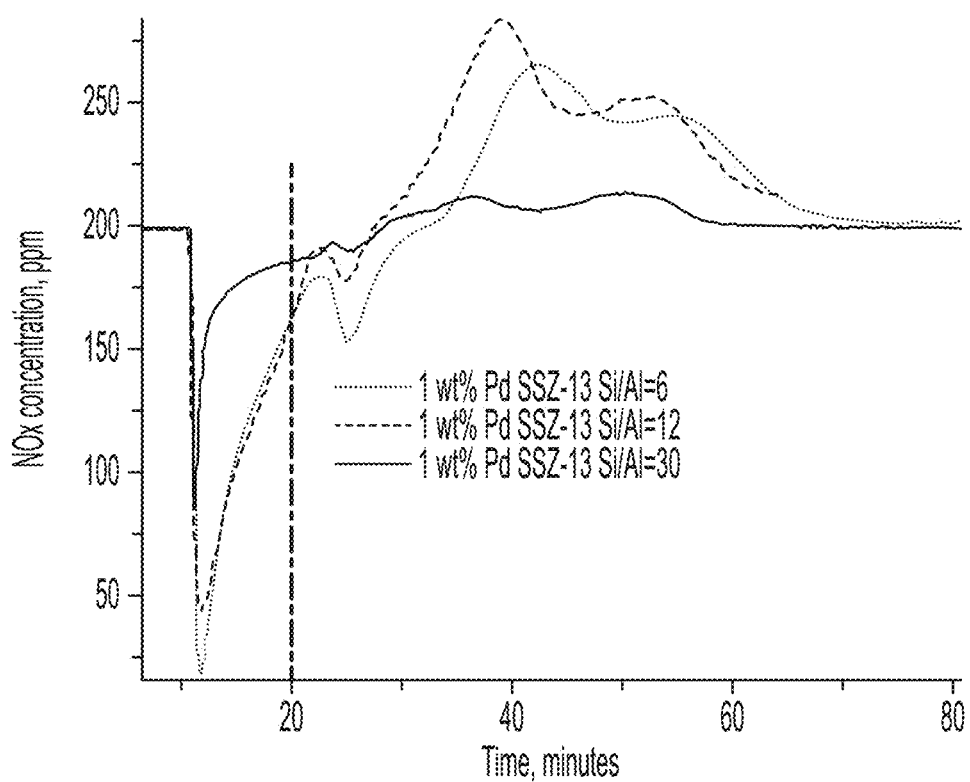
FIG. 2 shows the PNA performance of 1 wt % Pd SSZ-13 materials with different Si/Al ratios. NOx adsorption at 100° C. for 10 min (after 10 min bypass) followed with TPD (10° C./min). The feed gas mixture contains 200 ppm of NOx, 200 ppm CO 14% O2, 3% H2O.
Figure 3:
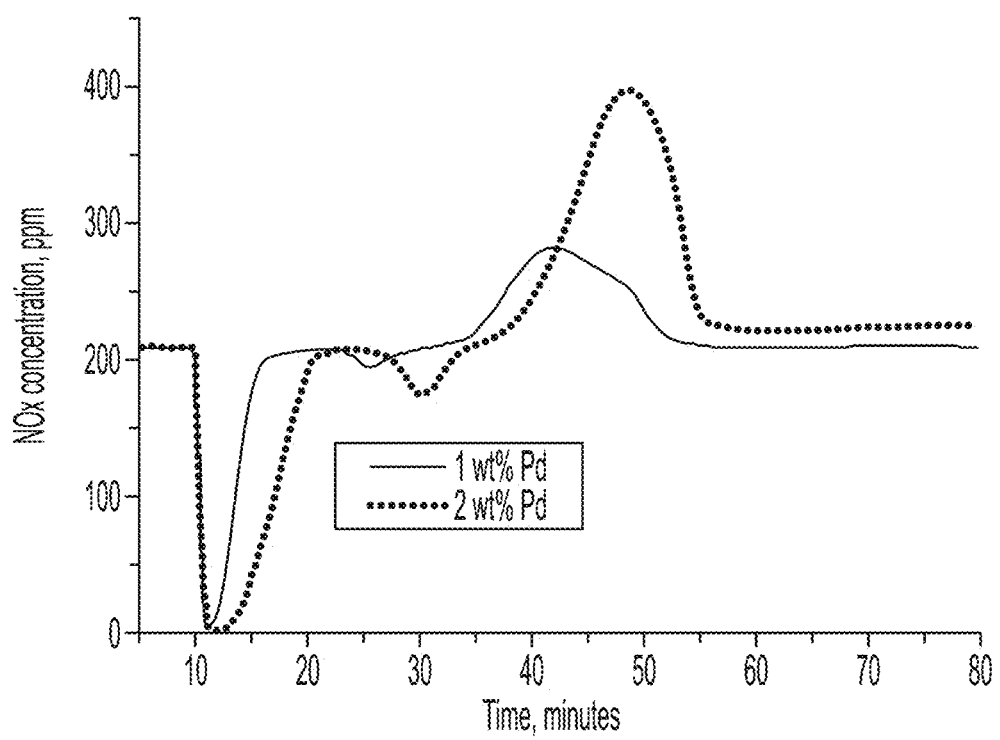
FIG. 3 shows the PNA performance of 1 and 1.9 wt % Pd SSZ-13 with Si/Al=6. NOx adsorption at 100° C. for 10 min (after 10 min by-pass) followed with TPD (10° C./min). The feed gas mixture contains 200 ppm of NOx, 14% O2, 3% H2O with 200 ppm CO. Note that for 1.9 wt % Pd/SSZ-13 more time was needed for the NOx to get back to the initial level due its high effectiveness at abating NOx; the desorption of NOx, therefore, was started after ~23 minutes.

HAADF-STEM images of the calcined Pd/SSZ-13 materials show an important trend: complete absence of nanoparticles at Si/Al=6, the appearance of small 1-2 nm PdO nanoparticles at Si/Al=12 and the presence of large PdO particles at Si/Al=30. The measured NO/Pd=1 for the 1 wt % Pd/SSZ-13 sample with Si/Al=6 as shown in FIG. 2 further corroborates the 100% dispersion of Pd. For Si/Al 12 and 30, correspondingly, the NO/Pd ratios were 0.87 and 0.3, indicating progressive agglomeration of Pd as the Si/Al ratio increases. In addition to HAADF-STEM imaging and PNA performance testing, we further characterized the 1 wt % Pd/SSZ-13 (Si/Al=6) sample with EXAFS and FTIR spectroscopies. XANES region of the EXAFS spectrum from this material revealed that the Pd ions were present in the +2 oxidation state. Analysis of the full EXAFS spectrum substantiated the absence of both Pd—O—Pd and Pd—Pd bonds and the Pd site can be approximated as Pd1O(3-4).

Since Pd2+ is a d8 ion, that prefers square planar environment, we assign the sites present in the 1 wt % Pd/SSZ-13 material to Pd1O4. DFT calculations further corroborate this point, and the DFT calculated average Pd—O bond distance (2.09 Å) is in good agreement with Pd(II)1O4 site suggested by the EXAFS data (2.03 Å). Pd(I) and Pd(III) have significantly longer Pd—O bonds, thus, their presence in the calcined sample cannot be substantiated; however, they may be present in quantities below the detection limit of the EXAFS technique.

Electron transfer reduces Pd2+ to Pd+, releasing the vacant cationic site onto which the nitrosyl ion NO+ anchors. CO adsorption leads to the predominant formation of Pdn+(CO)2 species (with CO frequencies 2214-2193 cm-1, we tentatively assign n=2), Pd2+(CO)(OH) and Pd2+(CO) species (with CO frequencies ~2150-2115 cm-1), Pd+(CO) (with CO frequencies ~2075 cm-1) and small Pd clusters Pdx(CO)y with CO linear stretch at ~2,000 cm-1 and some bridged CO<1950 cm-1 produced in small amounts (total fraction <3% of total observable Pd). This is the highest dispersion of 1 wt % Pd/Zeolite material that has ever been observed by FTIR of adsorbed CO at ambient temperature. DFT calculations allowed us to assign and exclude the possible formation of Pd—O—Pd dimeric sites in the zeolitic micropore. Thus, we conclude that Pd is ionically dispersed in the SSZ-13 framework.

The 1 wt % Pd—SSZ-13 (Si/Al=6) material synthesized by this new method has an NO/Pd=1 storage efficiency that translates to a storage capacity of 94 micromoles/g. Compared to the state-of-the-art materials described in the open and patent literature this material exhibits ~50% higher NO storage capacity under industrially relevant conditions than its best reported contender 1 wt % Pd/BEA and 2 times higher than the best reported 1 wt % Pd/SSZ-13.

This result then raised the question as to whether the amount of NOx stored in the Pd-loaded zeolite materials can be increased by simply increasing the metal loading. To this end we prepared additional Pd—SSZ-13 storage materials with metal loadings of 1.9, 3 and 5 wt %. Assuming that PNA performance, expressed as NO/Pd ratio, is directly proportional to Pd dispersion since PdO particles do not store NOx provided a basis for comparison. However, we found that for 1.9 wt % Pd/SSZ-13 (Si/Al=6) the NO/Pd=1 still holds. An additional increase in Pd loading to 3 wt %, however, resulted in deviation from this value, as the NO/Pd ratio dropped to 0.9, still a rather high storage efficiency. Increasing the metal loading to 5 wt %, however, resulted in the decrease in NO/Pd ratio to 0.7 Full utilization of Pd therefore appears to be achieved for materials with Pd loading up to 2 wt %, and the amount of NO stored was 94, 180, 250 µmoles/g for 1, 1.9 and 3 wt % samples, respectively. Some agglomeration of PdO on the 5 wt % Pd loaded SSZ-13 (Si/Al=6) material ultimately led to a decreased NOx storage efficiency. The most important consequence of these very high NOx storage capacities is the complete NOx removal from the exhaust gas stream for an extended period of time (~up to 100 sec for 2 wt % Pd).

FTIR confirms selective transformation of Pd(II)—NO species to a mixed carbonyl-nitrosyl complex Pd(II)(NO)(CO) in the presence of CO. The stability of this complex, all its bond lengths and the assignment of its frequencies was fully corroborated by DFT. Despite the fact that DFT predicts Pd(CO)(NO)2 complex to be more stable, the NO/Pd ratio and FTIR reveal that only Pd(II)(NO)(CO) can be formed under conditions relevant to PNA. DFT calculations further confirm the formation of the bent M-N—O bond which explains why Pd/Zeolite system is able to store NO efficiently: bent M-N—O corresponds to a covalent bond, much stronger than, for example, linear M-C—O fragments in metal-carbonyl complexes. This highlights the importance of using experimental and computational approaches together in order to correctly identify characteristics of adsorbed species.

Figure 4A:
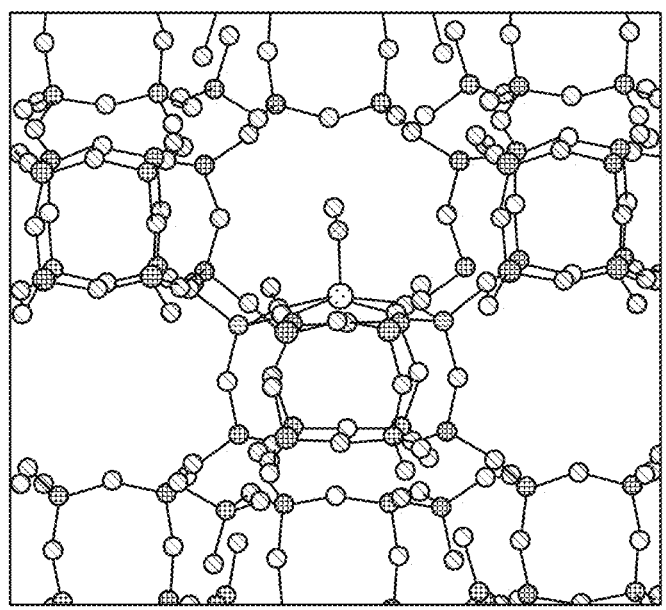
FIGS. 4A and 4B show optimized structures of selected complexes.
Figure 4B:
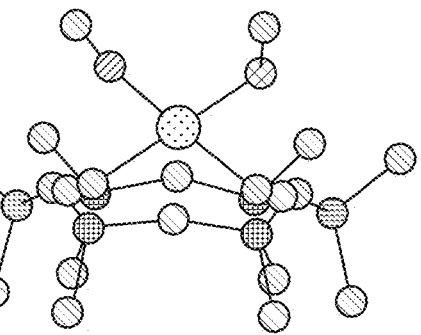

FIG. 4 shows examples of optimized structures of selected complexes: (a) location of the complexes in the cavity of the chabazite framework, represented by Pd2+(NO) complex and local structure of Pd2+(CO)(NO). It worth noting that, due to the formation of Pd(II)(NO)(CO) com-plex, CO is adsorbed on the Pd site analogous with NO. This allows unprecedented complete removal of CO from exhaust stream at 100° C. during cold start together with NOx.

Figure 5:
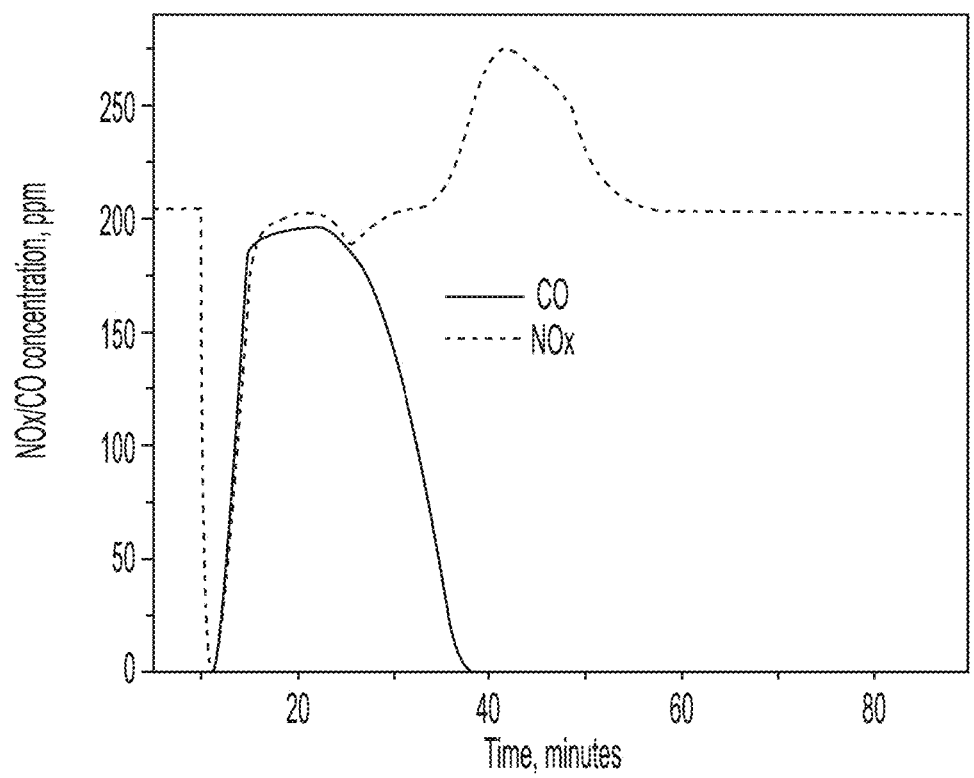
FIG. 5. NOx and CO abatement performance of 1 wt % Pd SSZ-13 with Si/Al=6. NOx adsorption at 100° C. for 10 min (after 10 min bypass) followed with TPD (10° C./min). The feed gas mixture contains 200 ppm of NOx, 14% O2, 3% H2O with 200 ppm CO.

FIG. 5 shows NOx and CO abatement performance of 1 wt % Pd SSZ-13 with Si/Al=6. NOx adsorption at 100° C. for 10 min (after 10 min bypass) followed with TPD (10° C./min). The feed gas mixture contains 200 ppm of NOx, 14% O2, 3% H2O with 200 ppm CO. These results further confirm the stoichiometry of the Pd(II)(NO)(CO) complex derived directly from the PNA performance measurement under simulated lean exhaust feed.

In additional testing Pd loaded SSZ-13 samples with Si/Al ratios of 12 and 30 exhibited the formation of progressively larger PdOx nanoparticles and not all Pd was dispersed (unlike in the sample with Si/Al=6). This happened despite the abundance of Brönsted acid sites in the zeolite structure: for example, for 1 wt % Pd/SSZ-13 with Si/Al ratio 30 the nominal [H+]/Pd(II) ratio is ~6. The answer is most certainly related to the increased hydrophobicity of the zeolite with increasing Si/Al ratio. Due to increasing hydrophobicity inside the zeolite channels at lower Al content, the aqueous solution containing the Pd precursor cannot infiltrate the pores. Water transport through the micropores in the confined (<1 nm) space of SSZ-13 has a barrier. We performed water TPD on H—SSZ-13 materials with Si/Al of 6, 12 and 30: the amount of water adsorbed in the micropores decreased dramatically as the Si/Al ratio increased from 6 to 30, as well as the strength of interaction of H—SSZ-13 with water as evidenced by the shift of the TPD peak to higher temperatures with a decrease in Si/Al ratio. Results of some of this testing is shown in Table 1.

TABLE 1

Comparison of different PNA materials with NOx storage.

| Material | NOx storage | NO/Pd ratio |
|---|---|---|
| 1 wt % Pd/SSZ-13 Si/Al = 11[39] | 48 µmoles/g | 0.5 |
| 1 wt % Pd/ZSM-5 Si/Al = 12[39] | 55 µmoles/g | 0.6 |
| 1 wt % Pd/BEA Si/Al = 14[39] | 65 µmoles/g | 0.68 |
| 2 wt % Pd/SSZ-13 Si/Al = 22[45] | 26 µmoles/g | N/A |
| 2 wt % Pd/ZSM-5 Si/Al = 22[45] | 24 µmoles/g | N/A |
| 1 wt % Pd/BEA Si/Al = 25[44] | 20 µmoles/g | 0.2 |
| Pd/Pt on various Alumina, Ceria and Ceria-Zirconia supports | 10-30 µmoles/g | N/A |
| 1 wt % Pd/SSZ-13 Si/Al = 6[this work] | 94 µmoles/g | 1 |
| 1.9 wt % Pd/SSZ-13 Si/Al = 6[this work] | 180 µmoles/g | 1 |
| 3 wt % Pd/SSZ-13 Si/Al = 6[this work] | 250 µmoles/g | 0.9 |

The hydrophilicity of the zeolite is another factor affecting the aqueous preparation of metal-loaded small/medium pore zeolites. Due to the less hydrophilic nature of these materials, not all of the precursor in aqueous solution can access the sites inside the zeolite pores. For such materials, aqueous preparation route will typically not produce highly loaded atomically dispersed metal species, and other more complex and expensive methods are required, such as use of chemical vapor deposition of a volatile organometallic precursor or loading an organometallic precursor in a non-polar solvent. In the aqueous route, this leads to the formation of PdOx (in the case of Pd) nanoparticles.

This also indicates that there is no diffusion limitation for Pd and Pt to enter the micropores of SSZ-13, as was previously suggested. The Si/Al ratio of these siliceous materials should be sufficiently low to utilize all metal and produce enough metal in the micropore (3<x<10). In contrast, with the utilization of our new method, we were able to load 1 wt % Pt in the zeolite micropores dispersed ionically. FTIR of adsorbed CO confirmed complete ionic dispersion of Pt, as no CO peaks attributable to metallic Pt were observed. This allows us to unambiguously assign, for the first time, 2130 and 2120 cm-1 peaks to Pt(II)-CO mono carbonyl complex located in 6 and 8-membered ring respectively; 2186 and 2152 cm-1 peaks belong to Pt(II)(CO)2 complex based on the simultaneous decrease of these two bands under vacuum. This data is nicely corroborated by HAADF-STEM images (FIG. 6). No Pt clusters were observed Unlike Pd/SSZ-13, there is no evidence of Pt(II) reduction upon CO adsorption. Pt/SSZ-13 synthesis appeared to be more "capricious" than that of the Pd/SSZ-13 and highly sensitive to calcination conditions. When the 1 wt % Pt/SSZ-13 (Si/Al=6) sample was calcined at 350° C. in air, no Pt agglomeration was observed. Calcination at 400° C., however, resulted in the formation of metallic Pt nanoparticles on the external surface of the zeolite crystals due to instability of Pt ions above this temperature and their migration out of the pore. Thus, ionic Pt/SSZ-13 is unstable at temperatures >400° C. and even when O2 is present in the gas-phase thermal treatment leads to the formation of metallic Pt particles.

FTIR spectra of adsorbed CO on the 400° C.-calcined 1 wt % Pt/SSZ-13 showed a prominent feature ~2090 cm-1, clearly confirming the formation of metallic Pt clusters. FIG. 7 shows CO adsorption (5 Torr, 20° C.) on 1 wt % Pt/H—SSZ-13 (Si/Al=6) that was calcined in oxygen at 400° C. 2090 and 1890 cm-1 bands belong to metallic Pt.

The aforementioned description provides a direct, simple and scalable route to highly-loaded ionic Pd and Pt in a small-pore siliceous (3<Si/Al<12) zeolite. This route utilizes only wet chemistry and does not require the use of expensive organometallic precursors or organic solvents. The use of the NH4-form of zeolite and the modified IWI method, instead of the conventional ion exchange enabled the exchange take place more fully. This new synthesis of Pd/SSZ-13 with realistic loadings of atomically dispersed Pd for immediate industrial application as passive NOx adsorbers which are able to abate 180 μmoles/g NOx and simultaneously CO during cold-start of the vehicle while maintaining atomic dispersion: rather remarkable performance under harsh industrial conditions.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

In view of the many possible embodiments to which the principles of the disclosed invention may be applied, it should be recognized that the illustrated embodiments included herein and in the attachments are only preferred examples of the invention and should not be taken as limiting the scope of the invention. Rather, the scope of the invention is defined by the following claims. We therefore claim as our invention all that comes within the scope and spirit of these claims.

What is claimed is:

1. A passive adsorber for NOx and CO gasses, the passive adsorber comprising: a SSZ-13 zeolite having a loading greater than 0.3 wt % of a dispersed transition metal catalyst species selected from the group consisting of (Pd)(II)(CO)(NO) and (Pt)(III)(CO)(NO); wherein wt % is measured on the basis of the transition metal.

2. The passive adsorber of claim 1, wherein the loading is greater than or equal to 0.5 wt %.

3. The passive adsorber of claim 1, wherein the loading is greater than or equal to 1 wt %.

4. The passive adsorber of claim 1, wherein the loading of the dispersed transition metal is atomically dispersed in pores of the zeolite.

5. A method for forming a passive adsorber, the method comprising the steps of:
exposing a NH$_4$-form of a SSZ-13 zeolite to a transition metal precursor comprising a counter ion whereby ions are exchanged between the zeolite and the transition metal precursor, to yield a NH$_4$-counter ion product; and
decomposing the NH$_4$-counter ion product into a gaseous product; wherein the transition metal precursor is selected from the group consisting of Pt or Pd.

6. The method of claim 5, wherein the counter ion of the transition metal precursor comprises NO$_3$.

7. The method of claim 5, wherein the NH$_4$-counter ion product decomposes at a temperature less than 400° C.

8. The method of claim 5, wherein the NH$_4$-counter ion product decomposes at a temperature less than 250° C.

9. The method of claim 5, wherein the NH$_4$-counter ion product comprises NH$_4$NO$_3$.

10. The method of claim 5, wherein the gaseous product comprises N$_2$O, H$_2$O, or both.

11. The method of claim 5, further comprising selectively removing the gaseous product through a membrane.

12. A method for making a passive absorber the method comprising the steps of:
exposing an H-form of an SSZ-13 zeolite to a transition metal precursor comprising a Pt or Pd counter ion in the presence of ammonium hydroxide;
exchanging ions between the zeolite and the transition metal precursor, to yield a NH$_4$-counter ion product;
decomposing the NH$_4$-counter ion product into a gaseous product; and
removing the gaseous product via separation through a membrane.

13. The method of claim 12, wherein the counter ion of the transition metal precursor comprises NO$_3$.

14. The method of claim 12, wherein the NH$_4$-counter ion product decomposes at a temperature less than 400° C.

15. The method of claim 14, wherein the NH$_4$-counter ion product decomposes at a temperature less than 250° C.

16. The method of claim 15, wherein the $NH_4$-counter ion product comprises $NH_4NO_3$.

17. The method of claim 16, wherein said exposing occurs in a mixture having a pH less than or equal to 12.5.

\* \* \* \* \*